United States Patent [19]

Seppänen et al.

[11] Patent Number: 5,919,863
[45] Date of Patent: Jul. 6, 1999

[54] PLASTIC MATERIAL FOR PACKAGING

[75] Inventors: Hanneli Seppänen, Helsinki; Markku Sainio, Porvoo; Torvald Vestberg, Porvoo; Lars-Åke Mattsson, Porvoo, all of Finland

[73] Assignee: Borealis A/S, Lyngby, Denmark

[21] Appl. No.: 08/737,360

[22] PCT Filed: May 9, 1995

[86] PCT No.: PCT/FI95/00244

§ 371 Date: Dec. 24, 1996

§ 102(e) Date: Dec. 24, 1996

[87] PCT Pub. No.: WO95/30715

PCT Pub. Date: Nov. 6, 1995

[30] Foreign Application Priority Data

May 10, 1994 [FI] Finland ................................ 942154
May 11, 1994 [FI] Finland ................................ 942173

[51] Int. Cl.⁶ .............................. C08L 33/12; C08L 23/08
[52] U.S. Cl. ............................... 525/85; 525/80; 428/523; 428/516; 428/500
[58] Field of Search ................... 525/80, 85; 428/523, 428/516, 500

[56] References Cited

U.S. PATENT DOCUMENTS

| | | | |
|---|---|---|---|
| 3,925,508 | 12/1975 | Agouri et al. | 525/80 |
| 4,064,198 | 12/1977 | Zeitler et al. | 525/80 |
| 4,414,053 | 11/1983 | Karim et al. | 156/308.2 |
| 4,759,984 | 7/1988 | Hwo | 428/349 |
| 5,164,456 | 11/1992 | Vestberg et al. | 525/324 |
| 5,300,578 | 4/1994 | Vestberg et al. | 525/252 |
| 5,312,872 | 5/1994 | Vestberg et al. | 525/324 |

FOREIGN PATENT DOCUMENTS

| | | |
|---|---|---|
| 0160984 | 11/1985 | European Pat. Off. . |
| 0178061 | 4/1986 | European Pat. Off. . |
| 0181632 | 5/1986 | European Pat. Off. . |
| 181 632 | 5/1986 | European Pat. Off. . |
| 0213698 | 3/1987 | European Pat. Off. . |
| 94/11434 | 5/1994 | WIPO . |
| 9411434 | 5/1994 | WIPO . |
| 9530715 | 11/1995 | WIPO . |

OTHER PUBLICATIONS

Abstract of JP 05214180.
Abstract of JP 01207340.
Abstract of JP 58180549.

*Primary Examiner*—Margaret W. Glass
*Attorney, Agent, or Firm*—Birch, Stewart, Kolasch & Birch, LLP

[57] ABSTRACT

The instant composition is a sealable and peelable polymer composition consisting essentially of a first ethylene copolymer grafted with a vinyl monomer and a second ethylene copolymer selected from ethylene/methylacrylate copolymers, ethylene/ethylacrylate copolymers and ethylene/butylacrylate copolymers.

24 Claims, No Drawings

PLASTIC MATERIAL FOR PACKAGING

The invention relates to a peelable polymer composition, a method for making the composition and films, sheets and lamination and coating products made from it.

In the packaging industry it is conventional that a product is packaged in a plastic film or a rigid plastic package and the package is heat sealed. The seal must possess a mechanical resistance sufficient to maintain the tight-seal properties during storage and transport. It is required that the package can be opened without destroying the product inside but to a growing extent it must also be possible to open the package without destroying the integrity of the film itself. The seal must be easily openable by pulling with hands without scissors or other instruments, the seal must be peelable. The package can also be used after opening for instance as a serving or heating disk (yogurt, micro-oven food) or the whole product is not taken away instantly but is kept in the opened package (candies, cereals).

The peelable seal can be defined to be the seal or joint between two films or sheets produced by heat sealing or impulse sealing, the joint thus formed having the property of being openable by pulling with hands. The seal can be between two films or two sheets or between a film or sheet and some substrate. Depending on the substrate an adhesion layer may sometimes be needed between the layers in the sheet or film.

The use of peelable seals in different packages has come more common with the development of packaging technique. There is a special need in the food processing industry, where there are applications in all sections, e.g. dairy products (cheeses, fats, yogurt), frozen food products, ready-processed food, canned food, meat and meat products, different snack and sweet packages. A very fast growing group is ready processed food and canned food which is heated manly in microwave oven.

In peelable compositions has most commonly been used as one component polybutylene and as another ethylene polymer, most often ethylene/vinylacetate copolymer (EVA) or low density polyethylene (LDPE). Also polypropylene can be included in the compositions. For instance in U.S. Pat. No. 4,759,984 is given a polymer composition, where the main component is EVA (75–92 wt-%) and minor amounts of polybutylene (6–25 wt-%) and polypropylene (2–15 wt-%) have been blended to it. Polyamide or polycarbonate are the most suitable substrates.

In the patent application EP 213,698 is given a composition, which consists of more than 50 wt-% of polybutylene and the rest is polypropylene and an ethylene polymer (EVA, HDPE, LDPE, LLDPE). In the European patent 178,061 there is a polymer blend containing 65–85 wt-% homo- or copolymer of ethylene (preferably LDPE or EVA), 5–30 wt-% polybutylene and 3–15 wt-% propylene polymer.

In the patent publication EP 196,727 is given a multilayer structure in which one layer is of polymer blend comprising 65–95 wt-% linear low density polyethylene (LLDPE) and 5–35 wt-% polypropylene and/or polyisobutylene.

In our earlier patent application FI925182 is given a peelable polymer composition containing 65–95 wt-% etylene/butylacrylate copolymer and 35–5 wt-% styrene grafted ethylene polymer, which is preferably ethylene/butylacrylate- or ethylene/vinylacetate copolymer. The weak point has, however, been the relatively narrow and rather low peelable area.

The purpose of this invention is to achieve a novel polymer composition, which is sealable and peelable at a very wide temperature area. Characterising to the polymer composition according to the invention is that it contains 5–80 weight-% ethylene/alkyl(meth)acrylate copolymer modified with vinyl monomer, preferably styrene, and 95–20 weight-% ethylene copolymer. Most preferably ethylene copolymer is ethylene/methyl(meth)acrylate, ethylene/ethyl(meth)acrylate, ethylene/butylacrylate or ethylene/vinylacetate copolymer. The amount of styrene modified ethylene copolymer must, however, be more than 35 weight-% if the other component is ethylene/butylacrylate copolymer. Methylarylate content of ethylene/methylacrylate copolymer can be 5–40 weight-%, preferably 16–25 weight-%. EthyLacrylate content of ethylene/ethylacrylate copolymer can be 10–30 weight-%. Butylacrylate content of ethylene butylacrylate copolymer can be 5–30 weight-%. Vinyl acetate content in ethylene vinylacetate copolymer is 10–30 weight-%.

Unexpectedly, it has been found that compared to the polymer compositions of patent application FI925182, a very wide peelable area is obtained, also at high temperatures. The peelable area according to patent application FI925182 e.g for blown films from polypropylene cups is about 195–210° C., whereas for the compositions according to this invention it is 190–270° C. The seal strength especially with polypropylene is extremely good if the sealing is made at high temperatures. The seal is then also sterilizable. The peelable area according to this invention is not obtained if the amount of styrene modified ethylene copolymer is less than 35 weight-% and the other polymer is ethylene/butylacrylate copolymer. The wide peelable area is obtained only with the compositions according to this invention.

In addition, with the polymer composition according to this invention, a very tight but still well peelable seal is obtained with polystyrene substrates.

Ethylene copolymer can be modified with styrene by all conventional grafting methods or preferably by impregnating styrene and a free-radical initiator into ethylene polymer and polymerising thereafter at a elevated temperature. Impregnation can be made without water, by addition of some water or by addition of water when more than half of styrene has impregnated into polyolefin particles or all the time in precence of great amounts of water. Polyrnerisation is made in water suspension. A preferred method for styrene modification is described in Finnish patents 85496, 86642 and 88170. Polystyrene content in modified ethylene copolymer is 10–70 weight-%, preferably 40–60 weight-%.

Polymer composition is made by conventional compounding methods like melt compounding in one- or tin-screw extruder or in Banbury mixer. Also dry blending can be used.

Polymer compositions can also contain small amounts of conventional polymer additives such as antioxidants, anti-blocking agents, antistatic agents etc.

The composition according to the invention can be used in manufacturing conventional packages containing peelable seals. From the polymer composition it can be produced blown or cast films or sheets as well as lamination and coating products which are peelable. Also multilayer structures in which one layer is made of film or sheet of the composition can be produced. It is typical for the compositions according to the invention that they are suitable to be used above different substrates like paper, oriented polypropylene, polyamide, polyethylene terephthalate.

Conventional cup or tray materials used in packages, like polystyrene, polypropylene, polyethylene and polyethylene terephthalate. Also paperboard coated with plastic, e.g. polyethylene, can be used.

The invention is described more in detail in the following examples.

The peeling temperatures and seal strengths of the polymer compositions according to the invention were investigated in the examples. Applications were extrusion coating and blown films. The following plastic materials were used in the experiments:

LD-polyethylene=NCPE 4524
HD-polyethylene=NCPE 0985
Ethylene/methylacrylate copolymer, E/MA=NCPE 5620, 20% acrylate
Ethylene/ethylacrylate copolymer, E/EA=NCPE 5860, 19% acrylate
Ethylene/butylacrylate copolymer, E/BA=NCPE 6420, 17% acrylate
Ethylene/vinylacetate copolymer, E/VA=NCPE 5118, 18% vinyl acetate
E/MA grafted with styrene=SEMA, NCPE 5475, polystyrene content 50%
E/EA grafted with styrene=SEEA, polystyrene content 50%
E/BA grafted with styrene=SEBA, polystyrene content 50%

All above mentioned materials are produced by Borealis Polymers Oy. Material properties are given in table 1. The melt flow index is measured by the method ISO 1133 and the melting point by the method ISO 3146.

TABLE 1

Properties of materials

| polymer | melt flow index g/10 min (190° C.) | melting point ° C. |
|---|---|---|
| NCPE 4524 | 4.5 | 112 |
| NCPE 0985 | 0.5 | 125 |
| NCPE 5620 | 6.0 | 77 |
| NCPE 5860 | 7.0 | 80 |
| NCPE 6424 | 1.5 | 100 |
| NCPE 5118 | 2.0 | 85 |
| NCPE 5475 | 0.7 | 77 |
| SEBA | 1.5 | 85 |
| SEBA | 1.5 | 95 |

EXAMPLE 1

A series of sealing samples were made in a Beloit extrusion coating line. The temperature for polyethylene (LDPE) was 320° C. and for peelable blends 280° C. Speed was 100 m/min. The thickness of the LDPE layer was 15 g/m² and of the peelable layer 25 g/m².

Sealing samples were the following:

1. Paper/LDPE/80% E/MA+20% SEMA
2. Paper/LDPE/80% E/MA+20% SEEA

Lids with a diameter of 75 mm were cut from the samples and they were sealed to polypropylene and polystyrene cups with KOPP's laboratory sealing machine. So called flat teflonated cup sealing heads were used. Sealing time was 0, 5 s and sealing pressure 0,5 N/mm². Results are given in Tables 2 and 3. The temperature area when the seal is peelable was from polypropylene cups about 190–250° C. and the opening strength 3–14 N and the temperature area from polystyrene cups was about 120–160° C. and the opening strength 4–14 N. The temperature area varies to some extent depending on the composition of the polymer blend.

TABLE 2

Extrusion coating, polypropylene cup. Sealability and seal strengths.

| Test n:o | Temperature ° C. | Opening strength (in the beginning) N | Peeling strength (later) N | peelability |
|---|---|---|---|---|
| 1 | 150 | 4.4 | 1.3 | peelable |
|   | 160 | 4.4 | 1.5 | peelable |
|   | 170 | 4.5 | 1.6 | peelable |
|   | 180 | 4.5 | 1.6 | peelable |
|   | 190 | 4.5 | 1.8 | peelable |
|   | 200 | 4.9 | 2.0 | peelable |
|   | 210 | 6.0 | 2.1 | peelable |
|   | 220 | 7.3 | 2.4 | peelable |
|   | 230 | 8.8 | 2.5 | peelable |
|   | 240 | 11.6 | 3.8 | peelable |
|   | 250 | 11.7 | 3.9 | peelable |
|   | 260 | 14.3 | 4.2 | peelable |
| 2 | 160 | 6.5 | 1.5 | peelable |
|   | 170 | 6.7 | 1.5 | peelable |
|   | 180 | 8.0 | 1.6 | peelable |
|   | 190 | 8.5 | 1.7 | peelable |
|   | 200 | 9.0 | 2.0 | peelable |
|   | 210 | 10.1 | 2.0 | peelable |
|   | 220 | 10.2 | 2.2 | peelable |
|   | 230 | 13.5 | 3.6 | peelable |
|   | 240 | 15.1 | 3.9 | peelable |
|   | 250 | 16.0 | 4.0 | peelable |
|   | 260 | 16.0 | 4.1 | peelable |

TABLE 3

Extrusion coating, polypropylene cup. Sealability and seal strengths.

| Test n:o | Temperature ° C. | Opening strength (in the beginning) N | Peeling strength (later) N | peelability |
|---|---|---|---|---|
| 1 | 190 | 7.5 | 1.5 | peelable |
|   | 200 | 9.0 | 2.0 | peelable |
|   | 210 | 12.5 | 2.6 | peelable |
|   | 220 | 15.4 | 2.8 | peelable |
|   | 230 | 17.1 | 3.0 | peelable |
|   | 240 | 18.0 | 3.4 | peelable |
|   | 250 | 20.1 | 3.6 | peelable |
| 2 | 190 | 4.9 | 1.4 | peelable |
|   | 200 | 7.6 | 1.9 | peelable |
|   | 210 | 15.0 | 2.4 | peelable |
|   | 220 | 15.1 | 3.0 | peelable |
|   | 230 | 20.0 | 3.1 | peelable |
|   | 240 | 19.5 | 3.5 | peelable |
|   | 250 | 19.7 | 3.9 | peelable |

EXAMPLE 2

20 weight-% styrene grafted ethylene/methylacrylate copolymer (SEMA, NCPE 5475) and 80 weight-% ethylene/methylacrylate copolymer (E/MA, NCPE 5620) were dry blended. With Reifenhäuser blown film line a two-layer film was made, which had HD-polyethylene (NCPE 0985) as substrate and the above mentioned polymer blend as peelable layer. The thickness of the substate layer was 150 μm and the thickness of the peelable layer 30 μm. The blow-up ratio in film blowing was 2,5. The temperature profile of HD-polyethylene extruder was 190-210-210-220-220-220-220-220 and of the extruder for peelable blend 150-170-170-180-190-220-220-220, when the temperature in die was 220° C.

Lid with 75 mm diameter were cut from the films and they were sealed with KOPP's laboratory sealing machine with a flat teflonated cup sealing head. Sealing time was 0,5 s and sealing pressure 0,5 N/mm². Peelable temperature area from the polypropylene cup was 190–220° C. The opening strength was 5–9 N. Accordingly, the peelable temperature area from polystyrene cups was 180–240° C. and the opening strength was 5–9 N. More accurate results are given in Table 4.

TABLE 4a

Blown film. Sealability and seal strengths. Polypropylene cup.

| Temperature ° C. | Opening strength (in the beginning) N | Peeling strength (later) N | peelability |
|---|---|---|---|
| 190 | 3.1 | 0.7 | peelable |
| 200 | 3.4 | 0.8 | peelable |
| 210 | 6.2 | 1.5 | peelable |
| 220 | 6.9 | 1.6 | peelable |
| 230 | 18.0 | 2.8 | peelable |

TABLE 4b

Blown film. Sealability and seal strengths. Polypropylene cup.

| Temperature ° C. | Opening strength (in the beginning) N | Peeling strength (later) N | peelability |
|---|---|---|---|
| 180 | 5.2 | 0.9 | peelable |
| 190 | 5.2 | 1.1 | peelable |
| 200 | 7.1 | 1.3 | peelable |
| 210 | 8.2 | 1.5 | peelable |
| 220 | 8.4 | 2.1 | peelable |
| 230 | 8.7 | 2.2 | peelable |
| 240 | 8.8 | 2.3 | peelable |

EXAMPLE 3

Example 2 was repeated, but 20% styrene grafted ethylene/methylacrylate copolymer (SEMA) and 80% ethylene/ethylacrylate copolymer (E/EA) were blended.

The peelable temperature area of the seal from polypropylene cups was 190–230° C., the opening strength of the seal was 2–12 N. Accordingly, the temperature area from polystyrene cup was 190–240° C. and the opening strength of the seal 2–3 N. The results are given in Table 5.

TABLE 5a

Cast film. Sealabillty and seal strengths. Polypropylene cup

| Temperature ° C. | Opening strength (in the beginning) N | Peeling strength (later) N | peelability |
|---|---|---|---|
| 190 | 1,9 | 0,2 | peelable |
| 200 | 1,9 | 0,3 | peelable |
| 210 | 2,6 | 0,5 | peelable |
| 220 | 6,9 | 1,3 | peelable |
| 230 | 9,8 | 2,2 | peelable |
| 240 | 12,3 | 2,6 | peelable |

TABLE 5b

Cast film. Sealability and seal strengths Polystyrene cup.

| Temperature ° C. | Opening strength (in the beginning) N | Peeling strength (later) N | peelability |
|---|---|---|---|
| 190 | 1,7 | 0,7 | peelable |
| 200 | 1,7 | 0,7 | peelable |
| 210 | 3,4 | 0,8 | peelable |
| 220 | 4,1 | 1,0 | peelable |
| 230 | 4,0 | 1,2 | peelable |
| 240 | 4,0 | 1,7 | peelable |

EXAMPLE 4

Example 2 was repeated, but 20% SEMA (NCPE 5475) ja 80% E/VA (NCPE 5118) were blended. The peelable temperature area of the seal from polystyrene cups was 190–240° C. and the opening strength of the seal was 4–7 N.

EXAMPLE 5

Example 2 was repeated, but 20% SEMA (NCPE 5475), 40% E/VA (NCPE 5118) ja 40% E/EA (NCPE 5860) were blended. The peelable temperature area of the seal from polystyrene cups was 190–280° C. and the opening strength of the sea was 4–14 N.

EXAMPLE 6

Example 2 was repeated, but 40% SEMA (NCPE5475), 60% E/MA (NCPE 5620) were blended. The peelable temperature area of the seal from polypropylene cups was 190–270° C. and the opening strength of the seal was 5–9 N.

EXAMPLE 7

Example 2 was repeated, but 60% SEMA (NCPE 5475), 40% E/MA (NCPE 5620) were blended. The peelable temperature area of the seal for polypropylene cups was 210–260° C. and the opening strength of the seal was 4–10 N.

EXAMPLE 8

40 weight-% styrene grafted ethylene/butylacrylate copolymer (SEBA) and 60 weight-% ethylene/butylacrylate copolymer (E/BA) were dry blended. With Reifenhäuser blown film line a two-layer film was made, which had HD-polyethylene (NCPE 0985) as substrate and the above mentioned polymer blend as peelable layer. The thickness of the substate layer was 150 µm and the thickness of the peelable layer 30 µm. The blow-up ratio in film blowing was 2,5. The temperature profile of HD-polyethylene extruder was 190-210-210-220-220-220-220-220 and of the extruder for peelable blend 150-170-170-180-190-220-220-220, when the temperature in die was 220° C.

Lids with 75 mm diameter were cut from the films and they were sealed with KOPP's laboratory sealing machine with a profiled cup sealing head (depth of profile 0,1 mm, width 1,2 mm). Sealing time was 0,5 s and sealing pressure 0,5 N/mm². Peelable temperature area from the polypropylene cup was 210–270° C. The opening strength was 6–9 N. More accurate results are given in Table 6,

TABLE 6

Blown film. Sealability and seal strengths. Polypropylene cup.

| Temperature °C. | Opening strength (in the beginning) N | Peeling strength (later) N | peelability |
|---|---|---|---|
| 210 | 5,8 | 1,1 | peelable |
| 220 | 6,4 | 1,3 | peelable |
| 230 | 6,8 | 1,8 | peelable |
| 240 | 7,5 | 2,0 | peelable |
| 250 | 7,8 | 2,1 | peelable |
| 260 | 8,4 | 2,1 | peelable |
| 270 | 9,0 | 2,3 | peelable |

EXAMPLE 9

Example 8 was repeated, but 60% slyrene modified ethylene/butylacrylate copolymer (SEBA) and 40% ethylene/butylacrylate copolymer (E/BA) were blended.

Peelable temperature area from the polypropylene cups was 210–260° C., the opening strength of the seal was 4–9 N. The results are given in Table 7.

TABLE 7

Blown film. Sealability and seal strengths. Polypropylene cup.

| Temperature °C. | Opening strength (in the beginning) N | Peeling strength (later) N | peelability |
|---|---|---|---|
| 210 | 4,0 | 0,9 | peelable |
| 220 | 5,0 | 1,1 | peelable |
| 230 | 5,8 | 1,3 | peelable |
| 240 | 7,0 | 2,1 | peelable |
| 250 | 8,5 | 2,3 | peelable |
| 260 | 9,5 | 2,5 | peelable |

We claim:

1. A sealable and peelable polymer composition, consisting essentially of:
   (A) 5–80 weight-%, based on the total weight of (A) and (B), of a first ethylene copolymer grafted with a vinyl monomer; and
   (B) 95–20 weight-%, based on the total weight of (A) and (B), of a second ethylene copolymer free from vinyl monomer grafts;
      wherein the amount of (A) must be greater than 35 weight-%, based on the total weight of (A) and (B), if (A) is a styrene modified ethylene copolymer and (B) is an ethylene/butylacrylate copolymer;
      wherein (B) is selected from the group consisting of,
         an ethylene/methylacrylate copolymer containing 5–40 weight-% methylacrylate, based on the total weight of the ethylene/methylacrylate copolymer,
         an ethylene/ethylacrylate copolymer containing 10–30 weight-% ethylacrylate, based on the total weight of the ethylene/ethylacrylate copolymer, and
         an ethylene/butylacrylate copolymer containing 5–30 weight-% butylacrylate, based on the total weight of the ethylene/butylacrylate copolymer.

2. The composition according to claim 1, wherein the amount of (A) is 15–60 weight-%, based on the total weight of (A) and (B), and the amount of (B) is 85–40 weight-%, based on the total weight of (A) and (B).

3. The composition according to claim 1, wherein (B) is an ethylene/methylacrylate copolymer containing 5–40 weight-% methylacrylate, based on the total weight of the ethylene/methylacrylate copolymer.

4. The composition according to claim 3, wherein the amount of methylacrylate is 16–25 weight-%, based on the total weight of the ethylene/methylacrylate copolymer.

5. The composition according to claim 1, wherein (B) is an ethylene/ethylacrylate copolymer containing 10–30 weight-% ethylacrylate, based on the total weight of the ethylene/ethylacrylate copolymer.

6. The composition according to claim 1, wherein (B) is an ethylene/butylacrylate copolymer containing 5–30 weight-% butylacrylate, based on the total weight of the ethylene/butylacrylate copolymer.

7. The composition according to claim 1, wherein (B) is an ethylene/vinylacetate copolymer containing 10–30 weight-% vinylacetate, based on the total weight of the ethylene/vinylacetate copolymer.

8. The composition according to claim 1, wherein the vinyl monomer is styrene and the polystyrene content in (A) is 10–70 weight-% based on the total weight of (A).

9. The composition according to claim 8, wherein the polystyrene content in (A) is 40–60 weight-%, based on the total weight of (A).

10. A packaging film or sheet manufactured from a polymer composition according to claim 1.

11. A layered structure, comprising at least one film or sheet, wherein said film or sheet is manufactured from a polymer composition according to claim 1.

12. A process for preparing a sealable and peelable polymer composition, comprising:
   mixing by compounding together in melt phase or by dry blending the components consisting essentially of:
      (A) 5–80 weight-%, based on the total weight of (A) and (B), of a first ethylene copolymer grafted with a vinyl monomer; and
      (B) 95–20 weight-%, based on the total weight of (A) and (B), of a second ethylene copolymer free from vinyl monomer grafts;
         wherein the amount of (A) must be greater than 35 weight-%, based on the total weight of (A) and (B), if (A) is a styrene modified ethylene copolymer and (B) is an ethylene/butylacrylate copolymer;
         wherein (B) is selected from the group consisting of,
            an ethylene/methylacrylate copolymer containing 5–40 weight-% methylacrylate, based on the total weight of the ethylene/methylacrylate copolymer,
            an ethylene/ethylacrylate copolymer containing 10–30 weight-% ethylacrylate, based on the total weight of the ethylene/ethylacrylate copolymer, and
            an ethylene/butylacrylate copolymer containing 5–30 weight-% butylacrylate, based on the total weight of the ethylene/butylacrylate copolymer.

13. A sealable and peelable polymer composition, consisting essentially of:
   (A) 5–80 weight-%, based on the total weight of (A) and (B), of a first ethylene copolymer grafted with a vinyl monomer; and
   (B) 95–20 weight-%, based on the total weight of (A) and (B), of a second ethylene copolymer free from vinyl monomer grafts;
      wherein the amount of (A) must be greater than 35 weight-%, based on the total weight of (A) and (B), if (A) is a styrene modified ethylene copolymer and (B) is an ethylene/butylacrylate copolymer; and wherein the first ethylene copolymer, immediately prior to grafting, and the second ethylene copolymer are each individually selected from the group consisting of ethylene/alkylacrylate, ethylene/alkylmethacrylate, and ethylene/vinyl acetate.

14. The composition according to claim 13, wherein the amount of (A) is 15–60 weight-%, based on the total weight of (A) and (B), and the amount of (B) is 85–40 weight-%, based on the total weight of (A) and (B).

15. The composition according to claim 13, wherein (B) is an ethylene/methylacrylate copolymer containing 5–40 weight-% methylacrylate, based on the total weight of the ethylene/methylacrylate copolymer.

16. The composition according to claim 13, wherein the amount of methylacrylate is 16–25 weight-%, based on the total weight of the ethylene/methylacrylate copolymer.

17. The composition according to claim 13, wherein (B) is an ethylene/ethylacrylate copolymer containing 10–30 weight-% ethylacrylate, based on the total weight of the ethylene/ethylacrylate copolymer.

18. The composition according to claim 13, wherein (B) is an ethylene/butylacrylate copolymer containing 5–30 weight-% butylacrylate, based on the total weight of the ethylene/butylacrylate copolymer.

19. The composition according to claim 13, wherein (B) is an ethylene/vinylacetate copolymer containing 10–30 weight-% vinylacetate, based on the total weight of the ethylene/vinylacetate copolymer.

20. The composition according to claim 13, wherein the vinyl monomer is styrene, and the polystyrene content in (A) is 10–70 weight-% based on the total weight of (A).

21. The composition according to claim 20, wherein the polystyrene content in (A) is 40–60 weight-%, based on the total weight of (A).

22. A packaging film or sheet manufactured from a polymer composition according to claim 13.

23. A layered structure, comprising at least one film or sheet, wherein said film or sheet is manufactured from a polymer composition according to claim 13.

24. A process for preparing a sealable and peelable polymer composition, comprising:

mixing by compounding together in melt phase or by dry blending (A) 5–80 weight-%, based on the total weight of (A) and (B), of a first ethylene copolymer grafted with a vinyl monomer; and (B) 95–20 weight-%, based on the total weight of (A) and (B), of a second ethylene copolymer free from vinyl monomer grafts;

wherein the amount of (A) must be greater than 35 weight-%, based on the total weight of (A) and (B), if (A) is a styrene modified ethylene copolymer and (B) is an ethylene/butylacrylate copolymer; and wherein the first ethylene copolymer, immediately prior to grafting, and the second ethylene copolymer are each individually selected from the group consisting of ethylene/alkylacrylate, ethylene/alkylmethacrylate, and ethylene/vinylacetate.

* * * * *